United States Patent [19]

Osborn et al.

[11] 3,852,237

[45] Dec. 3, 1974

[54] CLEARER POLYEFINS BY COMBINATION OF ARYL CARBOXLIC ACID PHTHALOCYANINE, AND QUINACRIDONE

[75] Inventors: Charles W. Osborn; Paul B. Milam, Jr., both of Bartlesville, Okla.

[73] Assignee: Phillips Petroleum Company, Bartlesville, Okla.

[22] Filed: Sept. 8, 1972

[21] Appl. No.: 287,251

[52] U.S. Cl....... 260/42.21, 260/42.46, 260/93.7 R, 260/94.9 GD, 260/94.9 GB
[51] Int. Cl. ............................................ C08f 45/14
[58] Field of Search............ 260/41, DIG. 35, 42.21, 260/42.46, 94.9 GD, 94.9 GB, 93.7 R

[56] References Cited

UNITED STATES PATENTS

| | | | |
|---|---|---|---|
| 2,844,484 | 7/1958 | Reidinger et al. | 106/289 |
| 3,207,739 | 9/1965 | Wales | 260/93.7 |
| 3,558,551 | 1/1971 | Gilbert | 260/41 |

Primary Examiner—Allan Lieberman
Assistant Examiner—J. H. Derrington

[57] ABSTRACT

A combination of agents, such as sodium benzoate with phthalocyanine, markedly improves the clarity of nucleated polyolefin, such as polypropylene, in molded objects. The haze experienced with a single nucleating agent is substantially reduced.

8 Claims, No Drawings

CLEARER POLYEFINS BY COMBINATION OF ARYL CARBOXLIC ACID PHTHALOCYANINE, AND QUINACRIDONE

This invention relates to methods to improve the clarity of polyolefins. The invention further relates to polyolefins with reduced haze.

BACKGROUND OF THE INVENTION

Among the difficulties in preparing containers from various polyolefins has been a tendency toward opaqueness and a tendency toward haze. These characteristics are objectionable for many packaging purposes. Clear containers exhibit the package contents most effectively in order to catch the eye of the observer and potential purchaser.

In the past, the opaqueness of containers made from polyolefins such as polypropylene has been reduced to some extent by a variety of agents. U.S. Pat. No. 3,207,739 discloses the use of benzoic acid compounds as additives in polyolefins. The phthalocyanine pigments are shown with various olefin polymers in U.S. Pat. No. 3,558,551. Metal free phthalocyanine has been employed in U.S. Pat. No. 3,367,926. However, these results, while satisfactory in many instances, certainly can stand definite improvement in order to achieve commercial acceptance of polyolefin containers.

OBJECTS OF THE INVENTION

It is an object of this invention to reduce opacity and/or improve the clarity of polyolefins.

Other objects and advantages of the invention will be apparent to those skilled in the art from the following disclosure and our appended claims.

SUMMARY OF THE INVENTION

The clarity of polyolefins is improved by using a unique combination of agents, more particularly a combination of an aryl carboxylic acid compound and a phthalocyanine compound, optionally with a quinacridone. The combination of agents produces surprisingly enhanced degrees of effectiveness over the results obtainable by the use of either type of agent alone.

DETAILED DESCRIPTION OF THE INVENTION

Our invention employs in combination at least one each of (I) aryl carboxylic acid compound plus (II) phthalocyanine compound; optionally with (III) quinacridone.

ARYLCARBOXYLIC ACIDS

The arylcarboxylic acid compounds which we employ in the combinations and methods according to our invention include both mono and dicarboxylic acids and their salts. The salts can be those of the metals of Group IA or IIA of the Periodic Table as set forth in the *Handbook of Chemistry and Physics*, 49th Edition, The Chemical Rubber Company, 1968–1969, at page B4. More specifically, these elements include lithium, sodium, potassium, rubidium, cesium, beryllium, magnesium, calcium, strontium, and barium. Presently preferred for availability, convenience, and economy are the sodium salts.

Any of the aryl mono or dicarboxylic acids, including salts, known as polyolefin nucleating agents can be utilized in our invention. The presently preferred acids can be represented by:

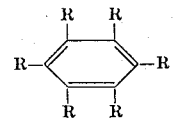

wherein each R is individually selected from hydrogen or alkyl of up to 4 carbon atoms per R group such that at least one R group represents —COOM, the total of —COOM groups is not over 2, and M represents the metal of Group IA or IIA of the Periodic Table.

Exemplary aryl carboxylic acid compounds include benzoic acid, orthomethylbenzoic acid, p-methylbenzoic acid, p-ethylbenzoic acid, p-isopropylbenzoic acid, p-tertiary-butylbenzoic acid, phthalic acid, tetramethylphthalic acid, trimethyldiethylbenzoic acid, and any of the equivalent Group IA or IIA metal salts, such as sodium phthalate, potassium acid phthalate, and the like, without needlessly repeating the list of such acid salts or salts.

PHTHALOCYANINE COMPOUNDS

By phthalocyanine is meant any of the compounds containing a tetrabenzoporphyrazine nucleus, four benzopyrrole nuclei joined by four N-atoms, either metal free or containing copper or some other metal. A typical structure for such pigments is shown below:

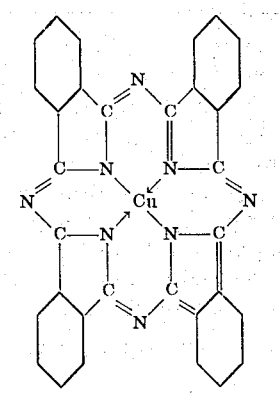

These materials are commercially available under the designation phthalocyanine green, phthalocyanine blue, and the like.

The two central hydrogen atoms in the above generic formula have been replaced by more than fifty metals to make the corresponding metal derivatives. Although metal free phthalocyanine itself is used commercially to some extent, the greatest use has developed for the copper derivatives of phthalocyanine as pigments, though any of the other metal phthalocyanines can be utilized where desired for particular applications or effects.

QUINACRIDONE PIGMENTS

The optional third component of our combination system, the quinacridones, represent a family of compounds known as quinacridones or quinacridone pigments, or quinacridone dyes. These are available as such as quinacridone red, or quinacridone violet, and the like, in a variety of physical forms including powders, dispersants, and the like.

One of the linear quinacridones is described in such as U.S. Pat. No. 2,844,484:

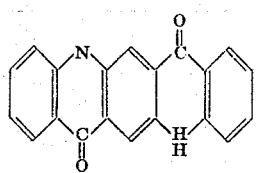

which may be produced as a pigment in a number of crystal phases as there described.

POLYMERS

The polymers which employ the combination of additives according to the process of our invention are those polymers of 1-monoolefins. Such polymers are prepared from any of the polymerizable 1-monoolefins. Commercially, these contain 2 to 8 carbon atoms per molecule, either homopolymers or copolymers, of one or more of ethylene, propylene, butenes, hexenes, octenes, presently preferred being polypropylene or ethylene-propylene, ethylene-butene-1, ethylene-hexene copolymers, or copolymers of any of these with other copolymerizable monomers. Any suitable method for preparing olefin polymers or copolymers can be employed for preparing the polymers is useful for treatment according to the process of our invention since the polymers of themselves are not part of our invention, but rather in combination with our combined treating agents.

COMBINED TREATING AGENTS

The amount of each component of our combination can vary considerably, depending on the total effect desired. In general, the amounts employed are within the ranges usually employed in poly(1-monoolefins) for nucleating purposes. A suitable range of aryl carboxylic acid or salt relative to the amount of polymer is from 0.001 to 0.5, preferably 0.01 to 0.05, weight per cent.

The concentration of the phthalocyanine can be fairly low, such as between 0.0005 and 0.02, weight percent based on the weight of the polymer, preferably about 0.005 to 0.01 weight percent. However, where the phthalocyanine pigments are used for the further purpose of imparting color to the finished object, up to about 0.1 weight per cent or more can be employed depending on depth of color desired. Mixtures of the various phthalocyanine compounds can be used.

When the third component, the quinacridone, is employed in the context of our invention, the concentration can be fairly low, such as about 0.0005 and 0.02, preferably between 0.0005 and 0.01, most preferably in the neighborhood of about 0.005 to 0.01, weight per cent based on weight of polymer.

Presently preferred is a total level of treatment of aryl carboxylic acid plus phthalocyanine, plus quinacridone where employed, of about 0.03 to 0.05, more preferred of 0.035 to 0.04, based on amount of polymer to be treated, excluding other additives commonly employed in polymer compounding. These ratios are those presently preferred to impart minimum color with improved clarity. The ratio of aryl carboxylic acid:phthalocyanine can vary widely, though a ratio of about 30 to 1 aryl carboxylic acid:phthalocyanine frequently is desirable. Amounts expressed are exclusive of other additives or compounding ingredients added to the polymer for other purposes.

Both the aryl carboxylic acid compound and the phthalocyanine, as well as the optional quinacridone, can be incorporated into the polymers by any manner utilized in the arts such as by melt blending, dry particle blending, solution blending, and the like. Additives may be added by procedures involving heat plastification of the polymer and extrusion for preparation of polymer pellets for shipment and the like. Of course, the additives should be added at a temperature below the decomposition point of any of the additives and/or polymers.

The particle size of our treating agents does not appear critical from the standpoint of the qualitative effect on the particles treated, but comminuted material of about 60 mesh or smaller presently is preferred, since less additive may be needed, and better clarity of transparent plastic compositions appears to be obtained.

Certainly, mixtures of more than one aryl carboxylic acid compound can be employed in combination with a phthalocyanine compound, and conversely two or more phthalocyanine compounds can be employed, or mixtures of either each or of both, and similarly as to the quinacridones.

If desired, as is usually the case, a variety of other additives may be present in the olefin polymer or may be added with the haze and opaqueness reducing combination according to our invention, or after, including antioxidants, stabilizers against ultraviolet radiation, and the like, added as convenient by any method at any stage and processing period.

EXAMPLES

The following examples are presented in order to further illustrate our invention, and are intended to be illustrative only, and not limitative of the reasonable and proper scope and extent of our process and novel compositions. The particular species employed, particular relationships, particular polymers, are intended to guide the practitioner of the art in addition to our discussion hereinabove and after and not, indeed, to limit the scope of our invention to particular entities.

EXAMPLE I

The poly(1-monoolefin) employed was a crystalline polypropylene characterized by a density 0.905, melt flow 5.0 (D 1238–65T, Condition L), flex-modulus (D 790–66) 225,000 psi.

The percent haze (100 minus percent haze = percent light transmission) was determined according to ASTM Method D–1003 using a Gardner Automatic Photomatic Unit Model AU–131.

The base resin as so described was used in the following formulations:

TABLE I

| Run No. | Additive | | Percent Haze | Percent Light |
|---|---|---|---|---|
| 1 | None | — | 24.5 | 75.5 |
| 2 | Sodium benzoate | 0.03% | 20.0 | 80.0 |
| 3 | Phthalocyanine blue | 0.01% | 17.5 | 82.5 |
| 4 | Sodium benzoate | 0.03% | | |
| | Phthalocyanine blue | 0.01% | 14.5 | 85.5 |

As can be observed from the runs above, the resin containing either type of agent alone did exhibit improved transmission, i.e., reduced haze. However, the combination of agents produced results far superior to results from either additive alone.

EXAMPLE II

A crystalline polypropylene characterized by a density of 0.909, melt flow 12.0, flex-modulus 280,000, was employed in further runs. Results are shown in Table II:

TABLE II

| Run No. | Additive | | Percent | |
|---|---|---|---|---|
| | | | Haze | Light |
| 5 | Sodium benzoate | 0.03% | 18.6 | 81.4 |
| 6 | Sodium benzoate | 0.03 % | | |
| | plus Phthalocyanine | 0.01 % | 14.5 | 85.5 |
| 7 | Sodium benzoate | 0.03 % | | |
| | plus Quinacridone Red | 0.01 % | 19.3 | 80.7 |
| 8 | Sodium benzoate | 0.03 % | | |
| | plus Quinacridone Red | 0.005% | | |
| | plus Phthalocyanine Blue | 0.005% | 13.2 | 86.8 |
| 9 | Sodium benzoate | 0.03 % | | |
| | plus CIBA Red GR Toner | 0.055% | | |
| | plus Phthalocyanine Blue | 0.005% | 16.3 | 83.7 |
| 10 | Sodium benzoate | 0.03 % | | |
| | plus CIBA Red GR Toner | 0.01 % | 19.7 | 80.3 |
| 11 | Sodium benzoate | 0.03 % | | |
| | plus FD&C Violet No. 1* | 0.005% | | |
| | plus Phthalocyanine Blue | 0.005% | 19.6 | 80.4 |
| 12 | Sodium benzoate | 0.03 % | | |
| | plus pentamine White BT** | 0.01 % | 33.3 | 66.7 |

*Wool Violet 5BN Aluminum Lake Color
**Whitening Agent Used in laundry detergent formulations.

As can be observed, in Run 6 in the combination of sodium benzoate plus phthalocyanine blue was highly effective. In Run 8 the tertiary combination of sodium benzoate plus phthalocyanine blue plus the quinacridone red also was effective.

Other combinations employed were not adequately effective in improving, i.e., reducing haze, and increasing light transmission. A variety of other combinations were employed including sodium benzoate with beta-naphthol, sodium benzoate with CIBA Yellow, sodium benzoate with CIBA Red, and the like, without noticeable improvement by the combination over anything obtainable by a single additive.

The polymers incorporating our invention can be employed in the fabrication of many useful articles. The compositions can be heated to a temperature above the melting point of the polymer and below the decomposition point of polymer ingredients, and while in such heat-plasticized condition, can be fabricated into many useful or potentially useful shapes, fibers, filaments, films, sheets, rods, tubes, particularly bottles and containers, by compression forming, injection molding, and the like.

Certainly, reasonable variations and modifications of our invention are possible yet still within the scope of our disclosure and without departing from the intended scope and spirit thereof.

We claim:

1. A polyolefin composition characterized by low haze and high light transmission comprising at least one polyolefin and a nucleating amount of each of (I) at least one aryl carboxylic acid compound, (II) at least one phthalocyanine, and (III) at least one quinacridone, wherein said aryl carboxylic acid compound is a mono or dicarboxylic aryl hydrocarbon acid or Group IA or IIA metal salt thereof and wherein at least one carboxylic acid group is attached to the aryl ring represented by

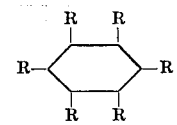

wherein each R is individually selected from hydrogen, or alkyl of up to 4 carbon atoms per R group such that at least one R group represents —COOM, the total of —COOM groups is not over 2, and M represents hydrogen or said metal of Group IA or IIA.

2. The composition according to claim 1 wherein said nucleating amount of said aryl carboxylic acid compound represents about 0.001 to 0.5 weight percent of said polyolefin, said nucleating amount of said phthalocyanine represents about 0.0005 and 0.02 weight percent relative to the weight of said polyolefin, and wherein said nucleating amount of said quinacridone is in the range of about 0.0005 to 0.02 weight percent based on the weight of said polyolefin.

3. The polyolefin composition according to claim 1 wherein said nucleating amount of said aryl carboxylic acid compound is in the range of about 0.01 to 0.05 weight percent, said phthalocyanine is in the range of about 0.005 to 0.01 weight percent, and said quinacridone is in the range of about 0.005 to 0.01 weight percent, each relative to said polyolefin.

4. The composition according to claim 3 wherein said polyolefin is a polymer of at least one alpha-monoolefin of 2 to 8 carbon atoms per molecule.

5. The composition according to claim 4 wherein said aryl carboxylic acid is a mono or dicarboxylic acid or Group IA metal salt thereof.

6. The composition according to claim 5 wherein said poly(1-monoolefin) is polypropylene.

7. The composition according to claim 6 wherein said aryl carboxylic acid compound is sodium benzoate, said phthalocyanine is phthalocyanine blue, and said quinacridone is quinacridone red.

8. The composition according to claim 1 wherein said aryl carboxylic acid compound is benzoic acid, ortho-methylbenzoic acid, p-methylbenzoic acid, p-ethylbenzoic acid, p-isopropylbenzoic acid, o-tertiary-butylbenzoic acid, phthalic acid, tetramethylphthalic acid, trimethyldiethylbenzoic acid, or a Group IA or IIA metal salt of any of these.

* * * * *

UNITED STATES PATENT OFFICE
CERTIFICATE OF CORRECTION

PATENT NO. : 3,852,237
DATED : December 3, 1974
INVENTOR(S) : Charles W. Osborn and Paul B. Milam, Jr.

It is certified that error appears in the above-identified patent and that said Letters Patent are hereby corrected as shown below:

Column 6, lines 10-18, should read as follows:

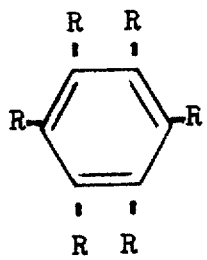

Signed and Sealed this nineteenth Day of August 1975

[SEAL]

Attest:

RUTH C. MASON
Attesting Officer

C. MARSHALL DANN
Commissioner of Patents and Trademarks